Jan. 13, 1931.    B. W. BROCKETT ET AL    1,788,942
REFRIGERATING CONTROL MECHANISM
Filed Aug. 31, 1927    2 Sheets-Sheet 1
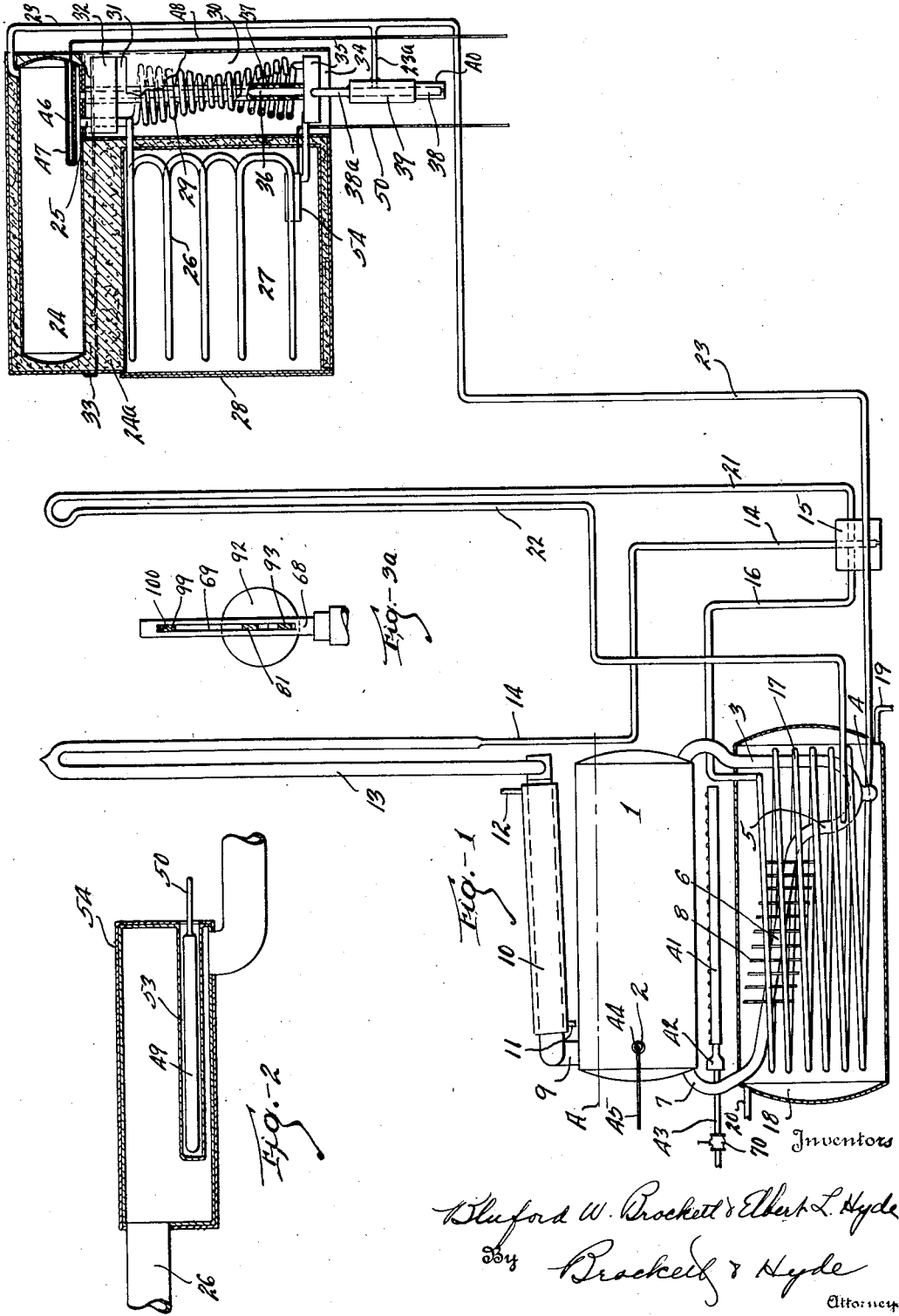
Inventors
Bluford W. Brockett & Elbert L. Hyde
By Brockett & Hyde
Attorney

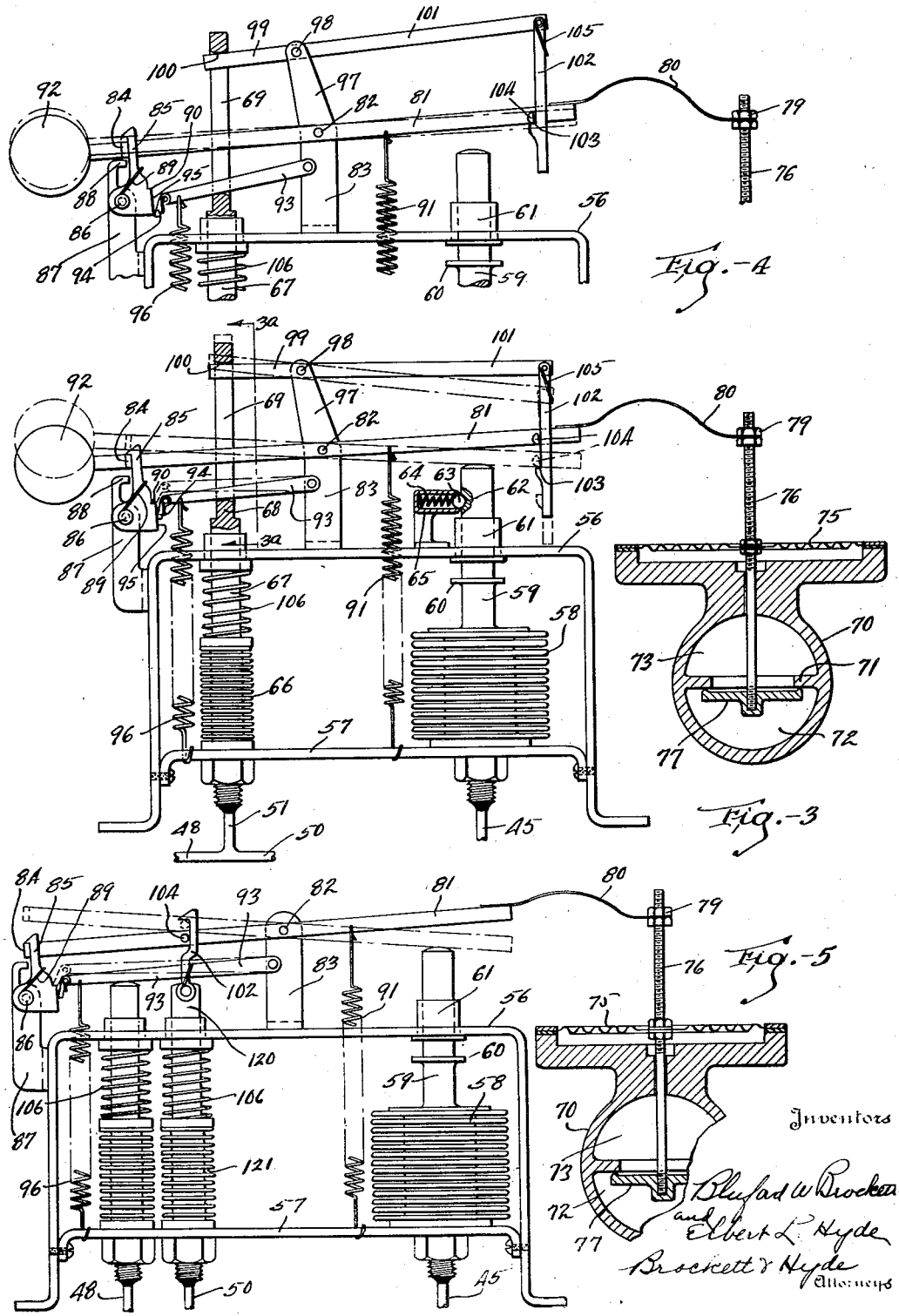

Patented Jan. 13, 1931

1,788,942

UNITED STATES PATENT OFFICE

BLUFORD W. BROCKETT AND ELBERT L. HYDE, OF CLEVELAND HEIGHTS, OHIO, ASSIGNORS TO EDMUND E. ALLYNE, OF CLEVELAND, OHIO

REFRIGERATING-CONTROL MECHANISM

Application filed August 31, 1927. Serial No. 216,651.

This invention relates to refrigerating apparatus, and more particularly to absorption systems and automatic controlling devices therefor.

In these systems, and particularly in intermittent cyclic absorption systems, the cycle includes boiling and refrigerating periods, during the first of which a suitable refrigerant, such as ammonia, is distilled from an absorbing agent, such as water, and is condensed and collected in an evaporator until the latter is sufficiently charged, whereupon the heat is turned off and the gas returns to the still now serving as an absorber, for absorption in the absorbing agent therein. Such systems are commonly provided with suitable control mechanism for reversing the cycle by turning the heater on and off.

The present invention has for its object to provide improved refrigerating apparatus equipped with controlling mechanism or devices arranged to safeguard the system and apparatus against all possible failures, by insuring discontinuation of the heating effect at the still or boiler upon failure of any part of the mechanism or apparatus and particularly upon failure of those parts which might result in dangerous conditions, such as excessively high pressure or like results.

Another object of the invention is to provide an automatically controlled refrigerating system which is safeguarded or protected against still other eventualities. For example, some refrigerating systems fail to function because the absorbing agent is carried over to the evaporator and finds no opportunity to return. In others, such as absorption systems heated by gas or other heat source an unduly prolonged heat period should be promptly terminated to avoid excessive pressure. Upon failure of the gas supply the plant should be shut down to avoid waste of gas or asphyxiation when the supply is again turned on while still other systems should be shut down upon failure of any part of the controlling mechanism, such as levers, expansible bellows, pressure containing control devices or the like, and the present invention has for its object to provide a system which takes care of all of such emergency conditions which can only be completely safeguarded by shutting down the plant and requiring the attention of a service man before it can be restarted.

Other similar conditions and objects of the invention will be apparent from the description and discussion hereinafter.

In the drawings, Fig. 1 is a schematic illustration of a refrigerating system including the present invention; Fig. 2 is a detail sectional elevation, showing the location of the emergency bulb; Fig. 3 is a detail elevation, on a larger scale, showing the controlling mechanism; Fig. 3a is a detail sectional elevation on the line 3a—3a, Fig. 3; Fig. 4 is a view similar to Fig. 3, but showing emergency operation; and Fig. 5 is a detail view showing a modification.

While the invention, in its broadest scope, is applicable to many different kinds of refrigerating systems or apparatus, it has been shown for purposes of illustration in connection with an intermittent cyclic absorption system, including a suitable still 1 adapted to receive a charge of aqua ammonia, for example, to a level substantially that indicated at A in Fig. 1. This still is provided with a reentrant well 2 in its side. Connected near the bottom and at its ends is a suitable cooling loop comprising the vertical leg 3, a sediment trap 4, an upturned vertical portion 5, and a more horizontal portion 6 leading to an inlet connection 7 entering the opposite end of the boiler. This loop is provided with heat radiating fins 8.

Connected to the top of the boiler is a gas outlet pipe 9 extending through a suitable cooling jacket 10 supplied with cooling water by the circulating pipes 11 and 12. This forms a rectifier for relieving the gas of some of its entrained absorbing agent, which the rectifier collects and drains back into the boiler. The opposite end of the pipe 9 is connected to a riser loop 13 extending to a considerable height and connecting to a return gas pipe 14. The former of these two pipes is of relatively large diameter to furnish additional rectifying means. The lower end of the pipe 14 extends down to a point near the bottom of a trap well 15 adapted to contain a quantity of mercury or other heavy sealing liquid. The side of the trap near its top is connected to a pipe 16 leading to the top of a condenser coil 17. The condenser coil and a portion of the loop, including a part of the leg 3, the sediment trap 4, the portion 5 and portion 6 are all enclosed in a tank 18 adapted to be supplied with cooling water by means of the pipes 19 and 20.

The trap 15 is also connected to a pipe 21 diametrically opposed to pipe 16 and rising to substantially the same height as the pipe 13 and then returning in a downwardly extending pipe 22 to the lower part of the more vertical loop portion 5 inside of the tank 18.

The bottom of the condenser communicates with a pipe 23 which leads up to the evaporator storage tank 24 located in a heat insulating casing 24a of the refrigerator or box. This liquid ammonia storage tank is provided with an outlet pipe 25 connected to the top of an ice freezing coil 26 arranged in a heat insulated freezing compartment 27 closed by a suitable insulated front door 28. The outlet pipe 25 is also connected to the top of a cooling chamber coil 29 located in a flue or bay 30 preferably forming a part of the casing for the entire evaporator. This flue is provided with an upper opening 31 adapted to be more or less closed by a shutter 32 operated by a suitable handle 33 at the front. By manipulating this shutter air circulation through the flue may be controlled at the top. The lower part of the flue communicates through an opening 34 with the main cooling chamber of the box.

The lower ends of both coils 26 and 29 are connected to a common sump or header 35, which communicates by a vertical pipe 36 directly with the bottom of the supply tank 24. This pipe 36 may be provided with a heat insulating jacket 37 for decreasing evaporation therein and providing a means for directly delivering the liquid ammonia from the heat insulated tank 24 to the header 35 and to the bottoms of the coils 26 and 29 and allowing evaporation and boiling in these two coils with discharge of gas through the pipe 23.

The header 35 is connected to a downwardly extending pipe 38a which leads to the bottom of a suck back trap casing comprising the lower sump 38 and an enlarged upper portion 39. A pipe 23a extends in through the side of the casing 39 just above the center and extends to and is in communication with the vertical leg of the pipe 23, as shown. The sump 38 of this trap is provided with a bath of mercury 40 sufficient in quantity to balance in the pipe 38a and the entire evaporator the desired column or charge of liquefied ammonia. Any excess or any additional absorbing agent which comes over during heating or distillation will pass this trap and flow back through the pipe 23 to the condenser, from which it is forced over into the trap 15 and thence into the cooling loop and back to the boiler. This arrangement of the suck back trap in a closed circuit with the upper part of the pipe 23 and the evaporator produces very effective operation of the suck back and does not result in unbalanced pressures which might interfere with the proper maintenance of the desired column of liquefied ammonia in the evaporator.

The boiler may be provided with a gas burner 41 having a mixer 42 and a supply line 43 having a valve 70.

In controlling these refrigerating systems, particularly the intermittent cyclic type heretofore described, it is necessary to provide some suitable controlling means, such as one which starts and stops the heater. Various arrangements are suitable for this purpose. One form of controlling mechanism involves some device located so as to be sensitive to some change in conditions at the still, such as the rise of the temperature therein, and another device located so as to be sensitive to a change in conditions at the evaporator, such as a change in temperature therein, said two devices cooperating through various parts to control operation of the heater, such as by turning an electric switch or gas valve on and off. The present system utilizes such control devices for the control of the normal intermittent cycle by reversal from heating to refrigerating operations, and vice versa. In addition thereto, the present control system involves an additional element which is made sensitive to a change in conditions in some part of the apparatus, which change occurs only under the various emergency conditions heretofore mentioned, to wit, the failure of a part of the apparatus, or improper operation or functioning of the system, creating a situation where a full shut off of the plant is not only desirable but probably necessary for safety purposes. Various arrangements of the normal control system for the normal intermittent cycle and the additional element for emergency purposes may be employed, and in the description hereinafter two distinct forms are referred to, although only for purposes of illustration and not in any sense of limitation.

The well 2 in the boiler is adapted to receive a hollow metal bulb or capsule 44 communicating by a small tube 45 with controlling mechanism, as will appear. This bulb stops the normal heating operation.

The evaporator is provided with two controller bulbs, one 46, arranged in a well 47 in the storage tank 24 of the evaporator and connected by a small tube 48 to controlling mechanism. This bulb starts the normal heating operation. The third bulb 49 is connected to controlling mechanism by a small tube 50. This is the emergency controller bulb. The three bulbs may be connected to controlling mechanism in various ways. In one embodiment tubes 48 and 50 merge into one tube 51 leading to the control. Bulb 49 is arranged in the ice chamber 27, or in a separate chamber 53 provided with a heat insulating casing 54. This bulb may be located at the bottom of the coil 26. In any event, this bulb should be arranged at some point associated with the evaporator so that it will be affected only by an abnormal rise in temperature, to wit, one which is higher than the normal temperature rise which affects the bulb 46. In other words, the bulb 46 is affected by normal rise in temperature due to the cessation of evaporation or refrigeration and, through the control to be described, starts another heating period, and as long as this part of the device is functioning properly, there is no occasion for the bulb 49 to be affected. It therefore is so located or insulated that it will not be affected by the same normal temperature variation as the bulb 46. This bulb 49 is the emergency or safety bulb. The three bulbs, one in the boiler, and the two in the evaporator, control the apparatus and the mechanism for this purpose will now be described.

This controller mechanism includes a frame comprising a U-shaped member 56 secured to any suitable support and having a lower cross member 57. Secured to this lower cross member 57 is what may be termed an expansible steam bellows 58 connected to the small tube 45 leading to the boiler bulb 44. This bulb contains a small quantity of water, while the remaining bulb space, the tube 45 and bellows 58 may be filled with a heavy oil or other pressure transmitting medium, the three parts forming a closed or sealed system. When the bulb water expands into vapor or steam, sufficient pressure is transmitted through tube 45 to expand the bellows 58, the upper end of which is provided with a plunger 59 provided with a stop 60 adapted to engage the lower end of a bushing 61 secured in the U-shaped frame member 56. This plunger extends up through the bushing and is provided on one side with a notch 62 adapted to receive a ball 63 urged toward the recess by spring 64 and arranged in a suitable casing 65 secured to the frame. This spring pressed ball serves to resist the action of the bellows 58 until sufficient expanding pressure is built up to overcome the locking effect of this ball, so that when it does overcome the locking effect, the plunger snaps up quickly and turns off the gas with a snap action, as will appear.

The cross member 57 also supports an evaporator bellows 66 connected to the small tube 51 and provided with a plunger 67 carrying a cross head 68 provided with a slot 69. This evaporator bellows 66 responds to the freezing and melting of proper volumes of water in the normal and emergency evaporator bulbs 46, 49 and the arrangement is such that melting of the ice in both bulbs produces maximum collapse of this bellows and, contrarywise, freezing of the liquid in both bulbs produces maximum expansion of this bellows. Obviously the freezing or melting of either bulb alone produces only half movement.

Secured to a stationary part near the frame of the controller or to it is a gas valve body 70 provided with a valve seat 71 separating the gas supply passage 72 from the gas discharge passage 73, connected to the burner supply pipe 43. The gas valve body is also provided with a diaphragm 75 connected at its center to a valve stem 76 carrying a valve 77. The upper end of the valve stem is threaded to receive suitable nuts 79 between which is located an operating spring 80 connected to one arm of a gas lever 81 pivoted at 82 on a support 83, the other arm of said lever extending beyond the pivot and being provided with a latch shoulder 84 adapted to cooperate with a latch 85 pivoted at 86 upon a support 87. This bracket is provided with a stop 88 toward which the latch is forced by a spring 89. The latch carries a shoulder 90 adapted to be engaged by a trip pawl to be described. Lever 81 lies above the plunger 59 so as to be moved by it counter-clockwise, Fig. 3, and when the lever is so moved the gas valve is seated upwardly and is held closed by the latch 85 engaging above the latch shoulder 84. The gas lever 81 is moved normally in a clockwise direction by spring 91 secured to the lever and to the frame so that when the lever is released, the gas valve springs open. If desirable, the lever 81 may be provided with a weight 92 which will tend to close the gas valve should the spring 91 break, but normally the effect of this weight is overcome by spring 91.

From the foregoing it will be seen that when the bellows 58 is expanded by steam generated in the boiler-bulb, the gas is shut off, thus terminating the heating part of the cycle. The latch 85, of course, then holds the gas valve closed, even after the collapse of bellows 58 by the reduction of temperature in the boiler during the refrigerating part of the cycle.

The latch 85 is released by a trip mechanism comprising a lever 93 pivoted to the bracket 83 and carrying a pivoted pawl 94 spring-urged toward the elongated side face 95 below the shoulder 90 of the latch 85. When the gas valve is closed, as described, and the refrigerating cycle is started during normal operation, this pawl is in the intermediate position shown in full lines, Fig. 3, but shortly after the commencement of the refrigerating period and probably after the collapse of the bellows 58, refrigeration freezes the water in the bulb 46 in the storage tank of the evaporator with the result that the bellows 66 is extended to its maximum and the pawl is moved to the uppermost position, shown in dotted lines in Fig. 3, above the shoulder 90. The parts remain in this position until the end of the normal refrigerating period when the melting of the bulb 46 in the storage tank of the evaporator permits half collapse of the bellows 66, and a spring 96, attached to the pawl lever, moves it down and releases the latch 85 from the gas lever, which, through its spring 91, opens the gas valve. As the pawl lever 93 moves downward its pawl 94 finally passes the shoulder 90 and the latch 85 springs back to position against the stop 88, ready to latch the gas lever when it is again moved counter-clockwise by expansion of the steam bellows 58 at the end of the next heating period.

In the construction and operation of this system the volumes of the various tanks, coils, etc., are made such and the charge of absorbing agent and refrigerant is so chosen that at the end of the boiling period the coils 26 and 29, pipe 36 and the storage tank 24 are practically full of liquid refrigerant. During the refrigerating operation liquid refrigerant is gradually withdrawn from the storage tank and supplied to the cooling and freezing coils, where it evaporates, so that the storage tank gradually empties, and the normal refrigerating cycle terminates, as described, at about the time said storage tank becomes empty, because bulb 46 is near the bottom of the storage tank. However, at the time the bulb 46 becomes effective the coils 26 and 29 remain full of refrigerant but the quantity is relatively small. These coils are also heat insulated from the storage tank 24, and the freezing coil 26, particularly, is in a separate insulated chamber, while the bulb 49 is within a special chamber of its own further insulated from chamber 27. The arrangement is such that during the normal boiling operation the temperature adjacent to the bulb 49 does not materially rise but in any event does not rise above 32°, the freezing point, and only emergency conditions, which involve undue or abnormal prolongation of lack of refrigeration, will result in melting of the ice in the emergency bulb 49 to render the same effective. In other words, during normal operation the refrigerating phase is terminated by melting of ice in bulb 46, but the ice in bulb 49 does not melt and continues frozen and ineffective during both boiling and refrigerating operations. If the ice in bulb 49 is melted by emergency conditions, the plant is shut down by turning off the heater, as now to be described.

Upon the bracket 83 is an arm 97 carrying a pivot 98 for a lever comprising a short arm 99 extending into the slot 69 under the shoulder 100 of the cross head 68 actuated by the evaporator bellows 66. The other arm 101 of this lever lies generally parallel with the right arm of the gas lever 81 and at its outer end carries the latch 102 provided with a shoulder 103 adapted to engage, under certain circumstances, a suitable lug 104 on the side of the lever 81. This latch is urged into engagement with the lug by a spring 105.

Fig. 3 shows the parts a short time after the termination of the boiling operation by expansion of bellows 58. Lever 81 is latched by the latch 85 and bellows 58 has again contracted by the cooling of the boiler, so that its plunger is below lever 81. The normal ice bulb 46 has not yet frozen, so that the pawl arm 93 is not fully lifted, but as soon as the bulb 46 freezes said arm is lifted to the position shown in dotted lines. This motion raises the shoulder 100 and permits the latch 102 to drop to the dotted line position, Fig. 3, but without affecting the gas valve. When the bulb 46 melts, bellows 66 contracts one unit of movement and plunger 67 moves to the position in full lines, Fig. 3, and latch 102 again assumes its full line position, but again without effect of latch 102 on lever 81, although latch 85 has released said lever and has permitted it to move to the dotted line position, Fig. 3, to open the gas valve.

The ice in bulb 49 melts only under the emergency conditions described and after melting of the ice in bulb 46 or simultaneously therewith. When it does melt, the bellows 66 collapses by two units of movement, twice its normal collapse, or to the lowermost position shown in Fig. 4, with the effect of pulling down the arm 99 of the upper lever and through the latch 102 raising the right hand arm of lever 81 and closing the valve.

To protect the apparatus from leaky or ineffective bulbs, or a failure of the bellows 66, a spring 106 may be arranged about the plunger 67 to forcibly collapse bellows 66 and produce the safety movement just described, if bellows 66 fails to do so. This spring 106 must obviously be stronger than the spring 91.

It will be noted that the arrangement of the gas valve is such that the diaphragm 75 normally tends to close the valve, so that if the compensating spring 80 breaks, the gas valve always closes and again the plant is shut down.

The complete operation will now be described, assuming the plant at normal room temperature, with the boiler cold, and the liquid in both of the bulbs in the evaporator melted. The parts are then in the position shown in Fig. 4 and the gas valve is held in its maximum upper position by the complete collapse of the bellows 66, with the lever 81 slightly above the dotted line position to which it is moved by the steam bellows 58.

To start the plant, the operator releases the gas valve by manually or otherwise releasing both of latches 102 and 85, when the spring 91 moves the gas lever 81 in a clockwise direction and opens the gas valve. The gas burner is then ignited by a pilot or other means and the distilling operation at the boiler proceeds. The gas passes through the rectifier, through the trap 15 and to the condenser, where it is condensed and liquefied, and is finally delivered to the storage tank 24. Here some of the warm liquor passes down into the coils and fills them, but with little heating effect, so far as the cooling and refrigerator freezing chambers are concerned, due to the small capacity of these coils for the warm liquefied ammonia. When the temperature of the boiler rises sufficiently and the proper amount of liquefied ammonia has been supplied to the evaporator, steam is generated in the bulb 44 causing the steam bellows 58 to expand and shut off the gas or heat supply. Its movement, however, is not sufficient to cause lever 81 to latch with the latch shoulder 103, because this latch shoulder is still held in the position shown in Fig. 4, which is slightly above latching position. The reason for this is the fact that both of the evaporator bulbs are still melted, because there has been no refrigerating period. When the refrigerating period occurs, however, both evaporator bulbs are ultimately frozen, when the bellows 66 expands to the maximum, causing the latch 102 to be moved down to the dotted line position shown in Fig. 3. At the termination of the refrigerating cycle during normal operation, the bellows 66 collapses a half stroke and the latch 102 moves up to the full line position shown in Fig. 3, which is insufficient to cause it to interfere with or engage with the lug 104 on the side of the gas lever 81. As long as the plant functions normally, the latch 103 is ineffective but whenever lack of refrigeration is unduly or abnormally prolonged for any reason, the bellows 66 completely collapses, turns off the gas or other heat supply and shuts down the plant.

In the arrangement shown in Figs. 3 and 4, the normal service bulb 46 and emergency bulb 49 communicate by small tubes 48 and 50 with a single tube 51 communicating with the bellows 66, the two bulbs and bellows forming a sealed unitary system. Freezing or melting in either bulb produces a single unit of movement of bellows 66, while simultaneous effect of both bulbs produces double movement of the bellows. Fig. 5 shows another arrangement in which each of the normal service and emergency bulbs actuates its own individual bellows or other operating control device. In this arrangement the control mechanism, as before, includes the gas valve 70 operated by a lever 81, one arm of which is actuated by the steam bellows 58, while the other arm is latched by the latch 85 which, in turn, is released by the latch arm 93 actuated by a plunger connected to the normal service bellows 66. In this form the lever 101 of Fig. 4 is omitted and the spring latch 102 is effective upon a pin or shoulder 104 of lever 81, as before, but is connected directly to the plunger 120 of an emergency bellows 121 communicating by a tube 50 with the freezing bulb 49.

The operation of this form of the invention is the same as that previously described. When both bulbs 46 and 49 are frozen the latch 102 lies above the range of movement of the pin 104 throughout oscillation of lever 81 due to reversals of the cycle from boiling to refrigeration and vice versa, but upon emergency operation the bellows 121 contracts and, whatever be the position of the other parts, the lever 81 is now moved to close the valve 70.

Both forms of control mechanism and their equivalents function to shut of the plant under a wide variety of emergency conditions, some of which may be referred to as follows:

If any of the tubes 48, 50 or 51 break or either of the bellows 66 or 121 punctures, the immediate effect is for said bellows to contract to the full amount, either under its own power, if sufficient, or by the effect of the spring 106, if such a spring is necessary. In either case, the gas valve is promptly shut off and no boiling operation can proceed or be initiated.

If a similar break or puncture occurs in the tube 45, the bellows 58 contracts or fails to expand and plunger 59 becomes or remains depressed. Whatever else may happen, the next boiling operation, if any, is not terminated at the proper time, because the plunger 59 does not rise. Therefore, the boiling operation continues with abnormal rise in temperature at the still and abnormal prolongation of lack of refrigeration in the evaporator, so that after a suitable period the temperature at the bulb 49 rises abnormally, bellows 121 collapses, or the bellows 66, Fig. 3, collapses by a full stroke, and the gas is again shut off.

If the pilot valve is blown out, or the gas supply is shut off at the meter or otherwise fails, or in the case of electric current, if the supply of current shuts off, the whole plant gradually warms up until, again, the temperature at the emergency bulb 49 rises and the valve 70 is closed.

If any spring or lever fails to operate or breaks, or if the latch 85 fails to latch, or if the circulation or flow controlling system in the refrigerating mechanism fails to return to the still any absorbing agent carried over to the evaporator, or if the refrigerating plant as a whole fails to refrigerate to the proper degree,—under all these conditions and others, the final effect is to raise the temperature at the emergency bulb 49 and result in emergency closing of the main gas valve.

Upon any emergency operation of its kind, restoration of the former conditions, such as a renewed supply of gas or electric current or a restoration of balance or distribution of absorbing agent and refrigerant, does not cause resumption of the refrigerating cycle, which can only be effected by proper service, involving release of the latches 85 and 102 to permit the gas valve to be opened by the spring 91 to again initiate a boiling operation, and such service of course will not be effected until after a careful and thorough inspection of the whole plant to determine the cause of its shut down.

What I claim is:

1. The combination with refrigerating apparatus including an evaporator, of control means for normally maintaining normal refrigeration, and additional emergency controlling means requiring operator restoration, inoperative during normal operation and sensitive to conditions at the evaporator, and operative upon failure of normal refrigeration to shut down the apparatus.

2. The combination with refrigerating apparatus including an evaporator, of controlling means for maintaining normal operating temperatures about said evaporator, and emergency means unaffected by normal changes in temperature about the evaporator and sensitive to an abnormal rise in temperature about the evaporator for shutting down the apparatus.

3. Refrigerating apparatus as in claim 1 wherein the emergency means is a heat responsive device protected against being affected during the normal refrigerating operations and sensitive to an abnormal failure of normal refrigeration for shutting down the apparatus.

4. In an absorption refrigerating apparatus including an evaporator, automatic controlling means for normally regulating said apparatus to produce normal refrigeration, and emergency means sensitive to conditions at the evaporator and unaffected by normal operation and responsive to abnormally prolonged failure of refrigeration for shutting down the apparatus.

5. The combination with an absorption system including a still and an evaporator, of heating means for said still, automatic means for normally regulating said heating means to produce successively recurrent heating and refrigerating part cycles, and emergency means unaffected by normal operation and sensitive to conditions at the evaporator and responsive to abnormally prolonged failure of normal refrigeration for shutting down the system.

6. Refrigerating apparatus as in claim 4 wherein the controlling means is provided with heat responsive actuating devices, one associated with the evaporator and affected by normal changes in temperature for causing the regulator to operate the apparatus under normal conditions and another also associated with the evaporator and unaffected by normal changes of temperature about the same and sensitive to an abnormal change of temperature to cause the controlling means to shut off the heating means.

7. In a refrigerating apparatus, means for supplying a refrigerant, an evaporator adapted to receive said refrigerant and having a portion normally maintained at the freezing point during all normal operations of the plant, and means under the influence of said frozen portion and adapted upon the melting thereof to shut off the apparatus.

8. In a refrigerating apparatus of the absorption type including a still absorber, a condenser and evaporator, controlling means for producing repeated normal heating and refrigerating operations, an evaporator element maintained by said apparatus at a substantially unchanged degree of refrigeration during normal operation, and means affected by a change in the refrigeration of said element for shutting off the apparatus.

9. In refrigerating apparatus of the absorption type including a still absorber, a condenser and evaporator, means for maintaining a portion of said evaporator at freezing temperature during all normal operations, controlling means for producing repeated normal heating and refrigerating operations, and emergency means associated with said frozen portion and maintained in action by the freezing effect thereof and adapted upon melting to shut off the apparatus.

10. Refrigerating apparatus as in claim 9 wherein the controller includes motor means for producing the heating operation and the emergency means is effective upon said motor means for causing it to shut off the apparatus.

11. Refrigerating apparatus, comprising a still-absorber, a heater therefor, an evaporator, and controlling means for said heater having parts sensitive to conditions in different parts of the evaporator, one for starting and the other for stopping the heater.

12. Absorption refrigerating apparatus of the intermittent type, comprising a still-absorber, a heater therefor, an evaporator, means for starting and stopping the heater governed by changes in refrigerating effect, and emergency means sensitive to evaporator conditions for stopping the heater upon abnormal prolongation of lack of refrigeration.

13. Refrigerating apparatus, comprising an evaporator, means for replenishing the supply of refrigerant therein to replace that used for refrigeration, normal control means therefor, and emergency control means sensitive to the refrigerating effect of the evaporator and adapted upon abnormally prolonged lack of refrigeration to stop the apparatus.

In testimony whereof we hereby affix our signatures.

BLUFORD W. BROCKETT.
ELBERT L. HYDE.